Nov. 25, 1958   W. T. ROSSELL   2,861,522
LIGHT-WEIGHT RAIL TRUCK
Filed Nov. 13, 1956   3 Sheets-Sheet 1
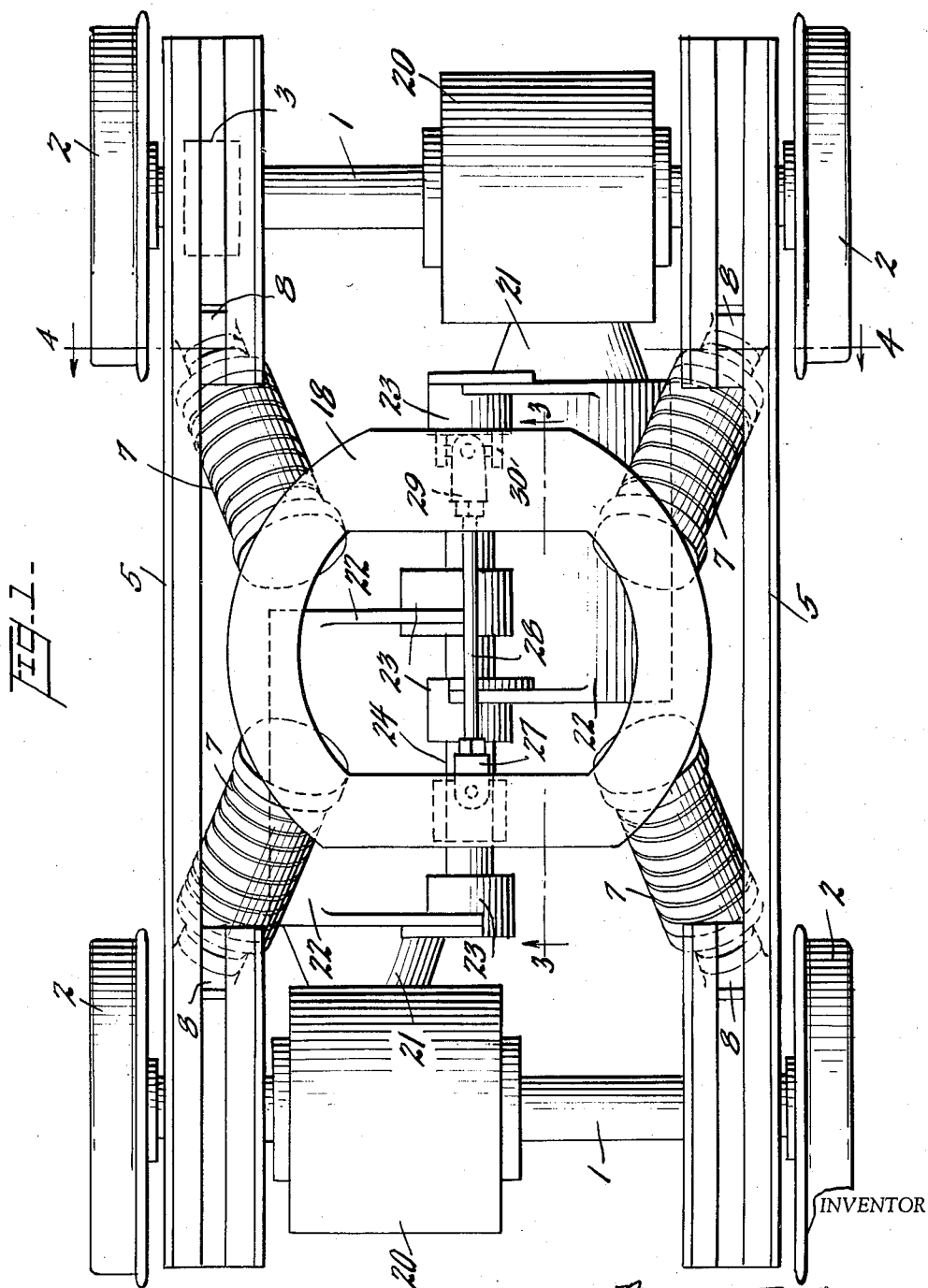
INVENTOR
WILLIAM T. ROSSELL
BY
ATTORNEY

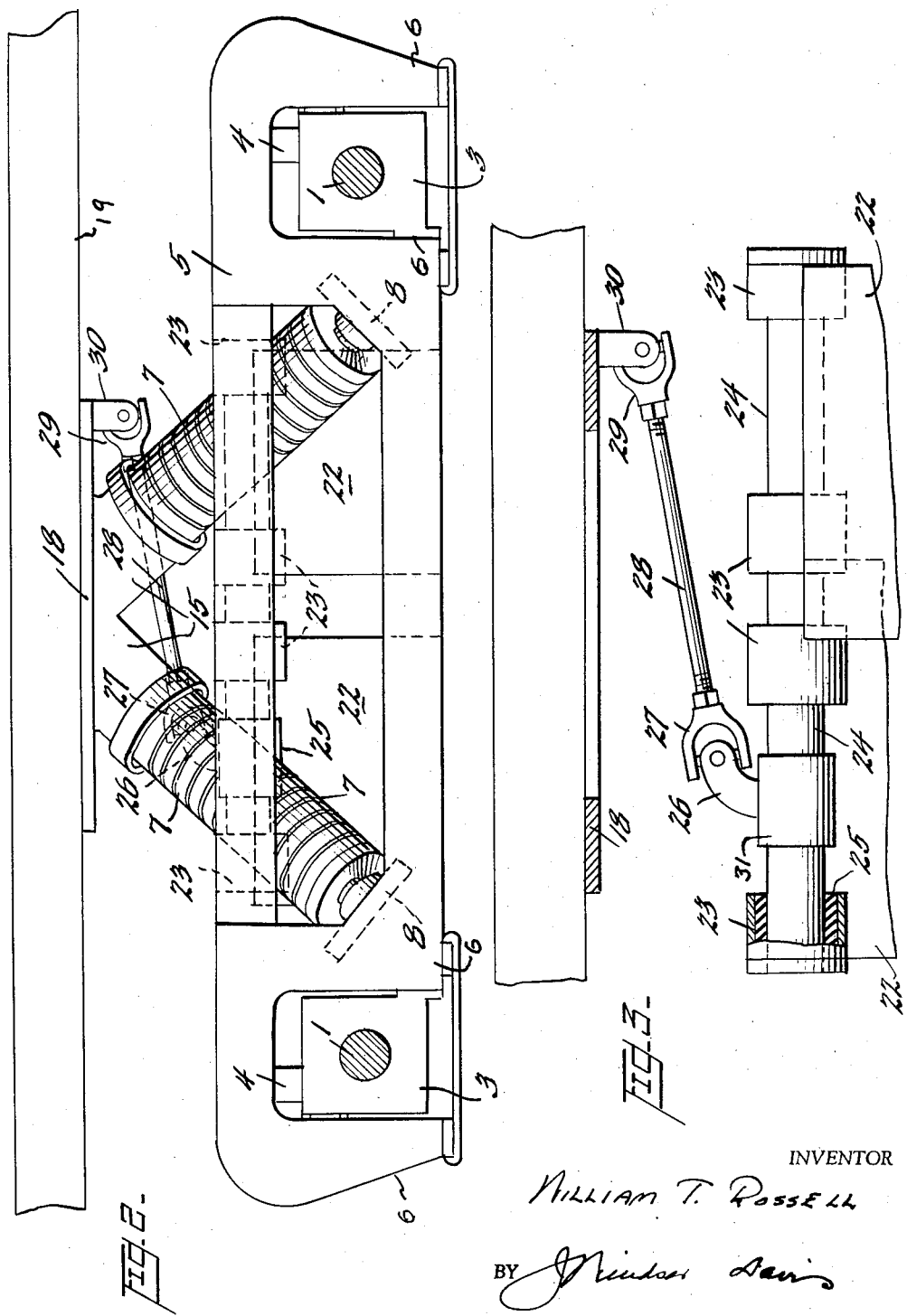

Nov. 25, 1958  W. T. ROSSELL  2,861,522
LIGHT-WEIGHT RAIL TRUCK
Filed Nov. 13, 1956  3 Sheets-Sheet 3
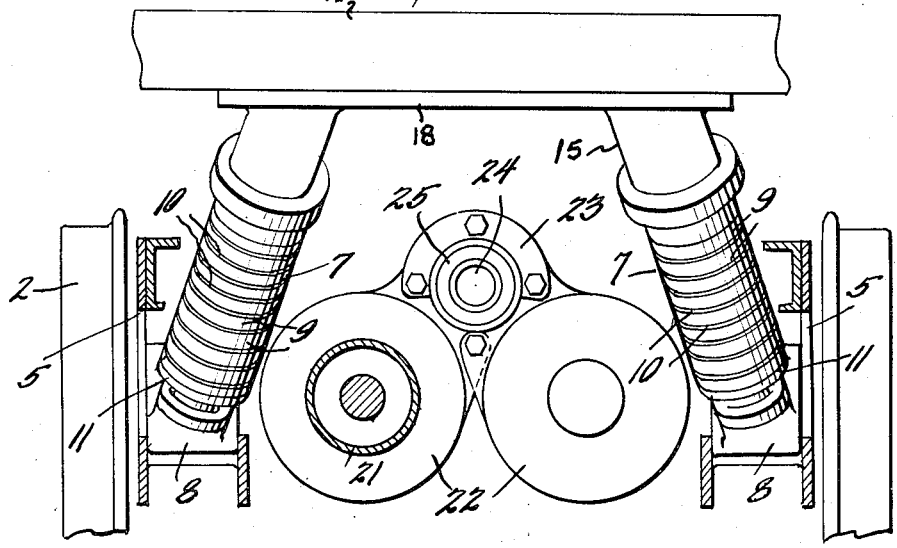
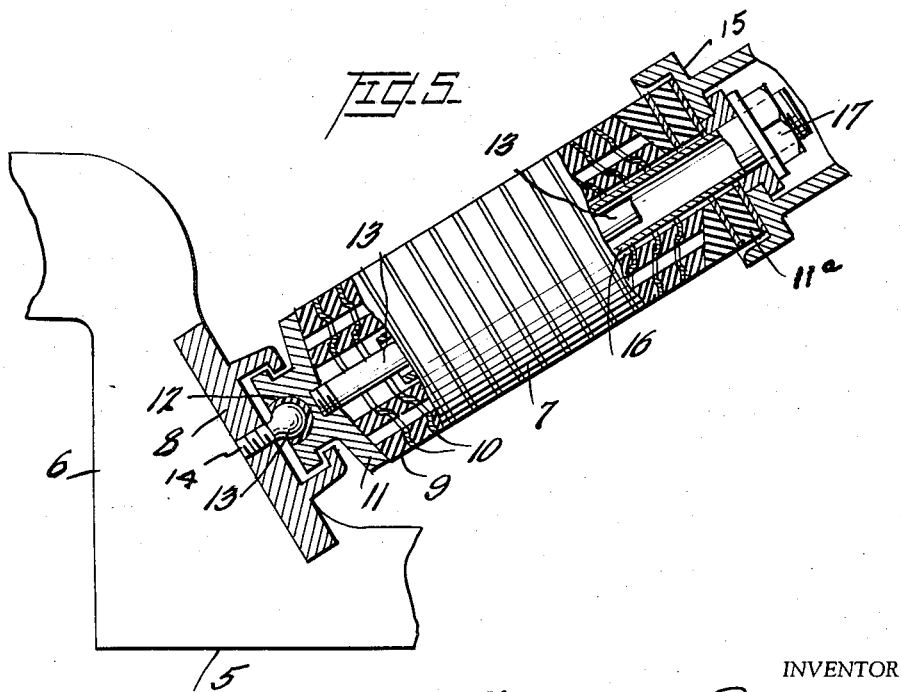
INVENTOR
WILLIAM T. ROSSELL
BY
ATTORNEY United States Patent Office 2,861,522
Patented Nov. 25, 1958

2,861,522

LIGHT-WEIGHT RAIL TRUCK

William T. Rossell, New York, N. Y., assignor to Transit Research Corporation, New York, N. Y., a corporation of New York Application November 13, 1956, Serial No. 621,737

11 Claims. (Cl. 105—171)

This invention relates to rail trucks and has for its object to provide a truck characterized by its light weight and improved springing system and riding qualities.

An object of the invention is to provide a powered truck in which the motors are connected to each other and to the axle assemblies in such manner as to constitute a complete driving assembly without a truck frame. A truck frame is then provided to assist in controlling the relative movements of the axles and to serve as supports for springs which, in turn, support a car body.

Another object is to provide a driving unit, as above described, in which the motors are rigidly connected, through housings, to the axles but strapped together in such manner as to permit slight relative movements of their axes in a vertical plane whereby one of the truck wheels may be elevated without elevating any other wheel.

Another object of the invention is to provide a springing system so arranged that the weight of a body thereon is transmitted to the vicinity of the axles thus protecting the side frames against bending stresses such as occur where the body load is accepted midway between the axles.

Another object of the invention is to provide a springing system designed to accept the weight of the body without the interposition of the usual bolster. As will be seen, the springs arise from seats near the journal bearings and then incline toward each other both in a fore and aft and in a lateral direction. The axes of the springs intersect at a point above the floor of the body, each spring being anchored to the bottom of the floor. The inclination of the springs is such that they neither aid nor resist the rotation of the trucks with respect to the body, as will be hereinafter explained.

Another object is to provide a main springing system in which each spring is composed of a stack of rubber rings, each ring being separated from the other by a metallic member. The rubber prevents the transmission of short wave vibrations from the truck to the body.

Another object is to provide a springing system, as above described, together with stabilizing arms or links which restrain the lateral movements of the body and which also assist in acceleration and deceleration of the body by the trucks.

Other objects and advantages will become hereinafter apparent as reference is had to the accompanying drawings wherein my invention is illustrated and in which Figure 1 is a top elevation of a truck built in accordance with my invention, Figure 2 is a side elevation of the truck of Figure 1 with the wheels removed, Figure 3 is a partial longitudinal vertical section taken along the line 3—3 of Figure 1 showing the connection of the motors to the body, Figure 4 is a transverse vertical section taken along the line 4—4 of Figure 1, and Figure 5 is a longitudinal diametric section through one of the main springs of the truck.

More particularly, 1 indicates the axles of a rail truck equipped with wheels 2 and journalled in the journal bearings 3. Supported on the journal bearings 3 by means of the rubber compression springs 4 are the truck side frames 5.

The rubber blocks or springs 4 are off-set from the vertical plane containing the axes of the axles 1 causing a tendency of the journal bearings to rotate about their axles thus causing diagonally opposite corners of the journal bearings to press against the pedestal guides 6 of the frames 5.

Two main springs 7 are inclined and supported by each side frame 5, the seats 8 of these springs being spaced apart as widely as possible and as near the journal bearings 3 as possible. In this manner the side frames are relieved of binding forces to which they would otherwise be subjected. The springs 7 on one side of the truck incline toward each other and they also incline toward the two springs of the other side of the truck. The four springs may thus be said to have a frusto pyramidal shape with their axes intersecting above the floor of a car body 19 supported thereby.

As best seen in Figure 5, the springs 7 are composed of a series of rubber rings 9 separated by metallic rings 10 and assembled in stacked relation. They each rest on a lower spring cap 11 which, in turn, has a socket seat 12 lined with suitable bearing material and resting on a ball joint 13. The ball joint 13 is carried by a shank 14 screw threaded into the seat 8 of the side frame 5. Extending upwardly from a screw threaded relation with the seat 11a only partially through all rings 9 and 10 is a rod 13. This rod fits into a sleeve 16 with which it has sliding relation, the sleeve 16 extending through the upper spring cap 11a and into the hollow upper spring seat 15 where it is provided with a nut 17. The springs 7 are thus protected against buckling.

The upper spring seats 15 are all secured to a common ring 18 which, in turn, is rigidly secured to the car body 19 underneath the floor thereof.

It will be observed that if the ring 18 is rotated by the car body with respect to the side frames 5, the springs may encourage the rotation or they may oppose it or they may do neither, depending upon the angularity of the springs. The angularity of the springs is preferably selected so that the springs 7 will neither oppose nor encourage the relative rotation but will remain neutral.

Another point which will be obvious from inspection is that relative lateral movement of the body with respect to the side frames, as when rounding a curve, will result in tilting of the top of the body inwardly of the curve. In other words, the inclination of the springs at one side of the body will increase, whereas the axes of the two springs at the other side of the body will move jointly toward a vertical plane so that the supporting action of these inclined springs resemble the action produced by a swing link.

The foregoing has been descriptive of the truck frame and supporting springs. The running gear of the truck will now be described.

The axles 1 are each equipped with gears (not shown) contained in gear housings 20 which are driven by propeller shafts (not shown) contained in the housings 21 and which are, in turn, driven by the main motors 22. The housing 20 is rigid with the housing 21, which is rigid with its motor 22.

Each motor is provided with two spaced brackets 23, the openings through all brackets being aligned. A rod 24 extends through all of these brackets and is separated therefrom by a rubber bushing 25, as best seen in Figures 3 and 4. The motors may thus have slight movement relative to each other but are jointly supported by the axles and axle housings. The motors, wheels, axles and journal bearings thus form a complete running gear. The pedestal guides 6 of the frame 5 merely aid in controlling the movements of the axes of the axles relative to each other.

In order to aid the springs 7 to transmit driving and retarding forces between the truck and the car body, I provide a bracket 31 which is firmly secured on the rod 24 and which carries one portion of a universal joint 26. The other portion 27 of this universal joint is carried by a shaft 28 which also carries one part 29 of a second universal joint. The other part 30 of the second universal joint is firmly secured to the ring 18 to which the springs 7 are anchored.

By this arrangement the body can move vertically and laterally with respect to the side frames 5, but relative rotation, as when the body attempts to roll, is opposed by the shaft 28.

Various changes may be made without departing from the spirit of my invention and I therefore desire to be extended protection as defined by the appended claims, wherein what I claim is:

1. In a rail truck, spaced axles each having a pair of spaced journal bearings thereon, a truck frame supported by said journal bearings and car body supporting springs supported by said frames, the springs on one side of said truck being inclined toward each other, the springs also being inclined toward the springs at the other side of the truck whereby all springs together form the corners of a frusto-pyramid.

2. In a rail truck, spaced axles each having a pair of spaced journal bearings thereon, a truck frame supported by said journal bearings and car body springs supported by said frame, each of said springs have a seat near one of said journal bearings and all of said springs being inclined toward each other.

3. In a rail truck, spaced axles each having a pair of spaced journal bearings thereon, a truck frame supported by said journal bearings and body supporting springs carried by said frame, each of said springs having a seat in the vicinity of one of said journal bearings and each of said springs being inclined toward the other of said springs, said springs comprising a plurality of stacked rubber rings adapted to accept the loading of the body in compression.

4. In a rail truck, two spaced axles each having a pair of spaced journal bearings thereon, a truck frame supported by said journal bearings, car body supporting springs carried by said frame, each of said springs having a lower spring seat adjacent one of said journal bearings, a plate adapted for rigid attachment to the underneath side of a car body, said plate having upper spring seats to receive said springs, said upper seats being substantially closer together than said lower spring seats thereby requiring the inclination of all of said seats toward each other.

5. In a rail truck, two spaced axles each having a pair of spaced journal bearings thereon, a truck frame supported by said journal bearings, car body supporting springs carried by said frame, each of said springs having a lower spring seat adjacent one of said journal bearings, a plate adapted for rigid attachment to the underneath side of a car body, said plate having upper spring seats to receive said springs, said upper seats being substantially closer together than said lower spring seats thereby requiring the inclination of all of said seats toward each other, said springs being given an angularity in a neutral plane such that upon rotation of the truck frame with respect to said plate the springs neither oppose said rotation nor do they set up a toggle action to encourage such rotation.

6. The combination of a rail truck frame, a car body floor and springs supporting said body from said frame, said springs being seated at spaced points on said frame and at points having lesser spacing both fore and aft and transversely on said car body whereby said springs are all inclined toward each other, the tops of said springs being horizontally displaced with respect to the bottoms thereof upon relative rotation of said car body floor and said truck frame.

7. The combination of a rail truck frame, a car body floor and springs supporting said body from said frame, said springs being seated at spaced points on said frame and at points having lesser spacing both fore and aft and transversely on said car body whereby said springs are all inclined toward each other, the tops of said springs being horizontally displaced with respect to the bottoms thereof upon relative rotation of said car body floor and said truck frame, said springs being inclined in neutral planes such that they neither oppose nor encourage such relative rotation.

8. The combination of a rail truck frame, a car body floor and springs supporting said body from said frame, said springs being seated at spaced points on said frame and at points having lesser spacing both fore and aft and transversely on said car body whereby said springs are all inclined toward each other, the tops of said springs being horizontally displaced with respect to the bottoms thereof upon relative rotation of said car body floor and said truck frame, said springs being inclined in neutral planes such that they neither oppose nor encourage such relative rotation, said springs having center lines which converge to a point substantially above the level of said floor.

9. The combination of a rail truck frame, a car body, springs seated at one end on said frame and on the underneath side of said car body at their other end, the springs at one side of the frame being inclined toward those at the other side of said frame, said springs freely supporting said body and tending to assume a position in a vertical plane on that side of the truck toward which the car body springs when rounding a curve.

10. In combination with a rail truck having spaced axles each extending through a gear housing, oppositely facing motors secured together and each fixedly secured through a propeller shaft housing to said gear housing and a frame supported from said axles, a car body, springs supporting said car body from said frame, said springs each having a lower seat near the corners of said frame and an upper seat beneath said car body, the upper spring seats being closer together than said lower seats whereby said springs all incline toward each other, and a link connecting the bottom of said car body with a bracket attached to one of said motors through which driving and retarding forces between said body and said truck are transmitted.

11. In combination, a rail truck comprising spaced axles having wheels and each extending through a gear housing, oppositely positioned driving motors resiliently connected together, and a propeller shaft housing rigidly connecting each of said motors to one of said gear housings thereby forming the running gear for the truck, said axles each having journal bearings near the outer ends thereof, a frame supported from said journal bearings and being independent of any connection to said motors, a car body, and springs supported by said frame and directly supporting one end of said car body.

References Cited in the file of this patent

UNITED STATES PATENTS

| 450,813 | Lamb et al. | Apr. 21, 1891 |
| 805,105 | Timmis | Nov. 21, 1905 |
| 1,438,837 | Leboucher | Dec. 12, 1922 |
| 2,023,756 | Brownyer | Dec. 10, 1935 |

FOREIGN PATENTS

| 757,896 | Great Britain | Sept. 26, 1956 |